US008865607B2

(12) United States Patent
Reilly et al.

(10) Patent No.: US 8,865,607 B2
(45) Date of Patent: Oct. 21, 2014

(54) INFILTRATED SILICON CARBIDE BODIES AND METHODS OF MAKING

(75) Inventors: Christopher J. Reilly, Whitinsville, MA (US); Edmund A. Cortellini, North Brookfield, MA (US); Robin M. Harrington, Leicester, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 220 days.

(21) Appl. No.: 13/301,646

(22) Filed: Nov. 21, 2011

(65) Prior Publication Data

US 2012/0165179 A1    Jun. 28, 2012

Related U.S. Application Data

(60) Provisional application No. 61/416,208, filed on Nov. 22, 2010.

(51) Int. Cl.
*C04B 35/565* (2006.01)
*B32B 5/22* (2006.01)
*C04B 41/00* (2006.01)
*C04B 35/573* (2006.01)
*C04B 41/88* (2006.01)
*C22C 29/06* (2006.01)
*C04B 41/51* (2006.01)

(52) U.S. Cl.
CPC .............. *C04B 41/88* (2013.01); *C04B 41/009* (2013.01); *C04B 35/573* (2013.01); *C04B 2235/5436* (2013.01); *C04B 2235/5472* (2013.01); *C04B 2235/96* (2013.01); *C04B 2235/6021* (2013.01); *C04B 2235/5427* (2013.01); *C04B 2235/6027* (2013.01); *C04B 2235/9615* (2013.01); *C04B 2235/5445* (2013.01); *C22C 29/065* (2013.01); *C04B 41/5155* (2013.01)
USPC .......... 501/88; 501/89; 428/307.7; 428/312.8; 264/643

(58) Field of Classification Search
CPC .................................................... C04B 41/5155
USPC .......... 501/88, 89; 428/307.7, 312.8; 264/643
See application file for complete search history.

(56) References Cited

U.S. PATENT DOCUMENTS

| 4,016,313 | A |   | 4/1977  | Schrewelius |
| 4,127,629 | A |   | 11/1978 | Weaver et al. |
| 4,777,152 | A |   | 10/1988 | Tsukada |
| 4,846,673 | A |   | 7/1989  | Tsukada |
| 4,943,413 | A | * | 7/1990  | Tank ............................ 420/528 |

(Continued)

FOREIGN PATENT DOCUMENTS

| JP | 6263480 A  |   | 9/1994 |
| JP | 07215781   | * | 8/1995 |

(Continued)

OTHER PUBLICATIONS

Machine translation of JP 2005146392, Jun. 2005.*

(Continued)

*Primary Examiner* — Karl Group
(74) *Attorney, Agent, or Firm* — Abel Law Group, LLP; Robert N. Young

(57) ABSTRACT

A composite article including a body made of recrystallized silicon carbide and an infiltrant, wherein the body comprises a static impact resistance of at least about 1800 MPa.

16 Claims, 4 Drawing Sheets

(56) References Cited

U.S. PATENT DOCUMENTS

| | | | |
|---|---|---|---|
| 5,338,945 A | | 8/1994 | Baliga et al. |
| 5,514,439 A | | 5/1996 | Sibley |
| 5,532,513 A | | 7/1996 | Smith et al. |
| 5,840,436 A | * | 11/1998 | Hanzawa et al. ............. 428/698 |
| 5,856,025 A | * | 1/1999 | White et al. ................. 428/614 |
| 5,904,892 A | | 5/1999 | Holmes |
| 5,972,818 A | | 10/1999 | Dynan et al. |
| 6,162,543 A | | 12/2000 | Dubots et al. |
| 6,186,768 B1 | * | 2/2001 | Schmitt ........................ 425/550 |
| 6,228,293 B1 | | 5/2001 | Kriegsmann et al. |
| 6,245,424 B1 | | 6/2001 | Lau et al. |
| 6,280,496 B1 | | 8/2001 | Kawai et al. |
| 6,297,183 B1 | | 10/2001 | Willkens et al. |
| 6,403,155 B2 | | 6/2002 | Dubots et al. |
| 6,562,745 B2 | | 5/2003 | Willkens et al. |
| 6,631,934 B1 | | 10/2003 | Buckley |
| 6,876,075 B2 | | 4/2005 | Fukui |
| 6,887,421 B2 | | 5/2005 | Dunn et al. |
| 7,026,045 B2 | | 4/2006 | Rettenbacher et al. |
| 7,141,309 B2 | * | 11/2006 | Kinoshita et al. .......... 428/539.5 |
| 7,648,932 B2 | * | 1/2010 | Weisensel et al. ............. 501/88 |
| 8,043,694 B2 | | 10/2011 | His et al. |
| 2002/0144773 A1 | * | 10/2002 | Richmond et al. ............ 156/281 |
| 2003/0047036 A1 | * | 3/2003 | Dobesberger et al. .......... 75/415 |
| 2005/0148455 A1 | | 7/2005 | Narendar et al. |
| 2007/0032370 A1 | * | 2/2007 | Weisensel et al. ............. 501/88 |
| 2009/0111678 A1 | | 4/2009 | Haerle et al. |
| 2010/0071328 A1 | | 3/2010 | Boussant-Roux et al. |

FOREIGN PATENT DOCUMENTS

| | | | |
|---|---|---|---|
| JP | 2005146392 A | | 6/2005 |
| WO | 2007088306 | * | 8/2007 |
| WO | 2009058841 A2 | | 5/2009 |

OTHER PUBLICATIONS

M.I. Pech-Canul et al., "Processing of Al—SiCp Metal Matrix Composites by Pressureless Infiltration of SiCp Preforms," Journal of Materials Synthesis and Processing, vol. 8, No. 1, dated 2000, 19 pages.

M.I. Pech-Canul et al., "Optimum for Wetting Silicon Carbide by Aluminum Alloys," Metallurgical and Materials Transactions A, vol. 31A, dated Feb. 2000, 9 pages.

J.C. Rawers et al., "Melt Infiltration of Selected Intermetallics into SiC," Journal of Materials Science Letters 9, dated 1990, 3 pages.

E.L. Hall et al., "Chemistry and Distribution of Phases Produced by Solid State SiC/NiCrAl Reaction," Metallurgical Transactions A, vol. 4A, dated May 1983, 10 pages.

James R. Weir, Jr. et al., "Oak Ridge Laboratory Materials Highlights," Oak Ridge National Laboratory, dated Dec. 1990, 31 pages.

The International Search Report and the Written Opinion for International Application No. PCT/US2011/061723 received from the International Searching Authority (ISA/KR) dated May 8, 2012, 10 pages.

IVF Project Report 06/07 "Summary", Mar. 10, 2006, 3 pgs.

Saint-Gobain Ceramic Materials "Siliconized Silicon Carbide (SiSiC)" accessed Oct. 18, 2013, 1 pg.

Gedney, Richard, "Guide to Testing Metals Under Tension", Advanced Materials & Processes, Feb. 2002, 3 pages.

Rohatgi, Dr. P.K., "State of the Art in Cast Metal Matrix Composites in the Next Millenium", The Minerals, Metals & Materials Society, 2000, 14 pages.

Milekhine, V. et al., "Mechanical Properties of FeSi, FeSi2 and Mg2Si", Intermetallics 10 (2002), pp. 743-750.

Fleischer, Robert L., "Intermetallic Compounds for High-Temperature Structural Use", Platinum Metals Rev., 36 (3), 1992, pp. 138-145.

Evans, A.G., "Strength Degradation by Projectile Impacts", Journal of the American Ceramic Society, vol. 56, No. 8, Aug. 1973, pp. 405-409.

Pech-Canul, M.I. et al., "Optimized Wetting of Silicon Carbide by Aluminum Alloys", The Minerals, Metals & Materials Society, 2000, 8 pages.

"Breviary Technical Ceramics", Think Ceramics, <http://www.keramverband.de/brevier_eng113/41313_4_3_1.htm>, retrieved May 24, 2010, 5 pages.

Tang, Jiancheng et al., "A High Ductility TiAl Alloy Made by Two-Step Heat Treatment", Materials Research Bulletin 38 (2003), pp. 2019-2024.

* cited by examiner

INFILTRATED SILICON CARBIDE BODIES AND METHODS OF MAKING

CROSS-REFERENCE TO RELATED APPLICATION

This application claims priority under 35 U.S.C. §119(e) to U.S. Patent Application No. 61/416,208 entitled "Infiltrated Silicon Carbide Bodies and Methods of Making," by Reilly et al., filed Nov. 22, 2010, which is assigned to the current assignee hereof and incorporated herein by reference in its entirety.

BACKGROUND

1. Field of Disclosure

The following is directed to composite articles, and particularly, composite articles comprising infiltrated recrystallized silicon carbide bodies.

2. Description of the Related Art

Various composite materials are commercially available, including certain ceramic composite bodies incorporating silicon carbide. Silicon carbide-based ceramic materials have been utilized in many applications for their refractory properties and mechanical properties. Among the types of silicon carbide-based ceramics available, various types exist based on the particular forming process, including for example, sintered silicon carbide, hot pressed silicon carbide, and recrystallized silicon carbide. Each of the various types of silicon carbide bodies can have distinct features. For example, sintered silicon carbide (such as Hexoloy®) can be a very dense material, but is generally expensive and complex to produce. On the other hand, more cost effective but relatively porous silicon carbide materials such as nitride-bonded silicon carbide (known by acronyms such as NBSC and NSIC) have found practical use in refractory applications. Such refractory components include furnace or kiln furniture utilized in connection with holding or supporting work pieces during firing operations, as well as refractory lining materials and structural walls defining the furnace heating area.

Certain limited compositions of composite silicon carbide-based materials have been made. See, for example, "Processing of Al—SiCp Metal Matrix Composites by Pressureless Infiltration of SiCp Preforms," Pech-Canul et al., Journal of Mat. Synthesis and Processing, Vol. 8, No. 1 (2000); "Melt Infiltration of Selected Intermetallics into SiC", by Rawers et al., U.S. Dept. of the Int., Journal of Materials Science Letters 9, pages 503-505 (1990); "Chemist and Distribution of Phases Produced by Solid State SiC/NiCrAl Reaction", Hall et al., Metallurgical Transactions A, Vol. 14A, 781-790, (1983); U.S. Pat. No. 6,562,745; U.S. Pat. No. 6,228,293; U.S. Pat. No. 4,846,673; and U.S. Pat. No. 5,532,513. However, these compositions are limited by particular types of silicon carbide bodies (e.g., powder compacts) and the particular type of materials incorporated into the silicon carbide matrix. Notably, in the context of infiltrating silicon carbide to form composite materials, available infiltrant materials are limited due to the difficulty in ensuring proper infiltration. For example, the most common infiltrant materials are metal silicon or intermetallics.

In view of the state of the art of silicon carbide-based materials, and in particular, nitride-bonded silicon carbide components, there is a need in the art for improved composites.

SUMMARY

According to one aspect, a composite article includes a body including recrystallized silicon carbide and an infiltrant, wherein the body comprises a static impact resistance of at least about 1800 MPa.

Another aspect is directed to a composite article including a body having recrystallized silicon carbide and a secondary continuous phase dispersed within the recrystallized silicon carbide, wherein the body comprises a static impact resistance of at least about 1800 MPa.

In yet another aspect, a composite article includes a body made of recrystallized silicon carbide and a secondary continuous phase dispersed within the recrystallized silicon carbide, wherein the body comprises a static impact resistance of at least about 1800 MPa and a wear rate of at least about 0.3 $mm^3/g$.

According to still another aspect, a composite article includes a body including recrystallized silicon carbide and a secondary continuous phase dispersed within the recrystallized silicon carbide, wherein the secondary continuous phase comprises a metal having a plastic strain at failure of at least 0.1% as measured according to a 3-point bend test according to ASTM 1161.

Another aspect is directed to a composite article having a body including two phases, wherein the first phase comprises recrystallized silicon carbide and wherein the second phase comprises an aluminum-based alloy having a plastic strain at failure of at least 0.1% measured according to a 3-point bend test according to ASTM 1161. The body has a static impact resistance of at least about 1800 MPa.

A composite article of another aspect includes a body having a primary continuous phase including silicon carbide and a secondary continuous phase dispersed within the primary continuous phase having interconnected porosity. The interconnected porosity is substantially filled with a metal having a $K_{IC}$ toughness of at least about 5 MPa $m^{1/2}$ as measured according to ASTM standard E399.

According to another aspect, a composite article includes a body having a primary continuous phase including silicon carbide, wherein the first continuous phase defines an interconnected network of pores comprising a bimodal distribution of pore sizes filled with a secondary continuous phase comprising an aluminum-based metal.

In yet another aspect, a method of forming a composite article includes the steps of providing a body comprising recrystallized silicon carbide, and infiltrating the body with an infiltrant to form a composite body, wherein the infiltrant is an aluminum-based metal comprising at least about 1% silicon and at least about 1% magnesium.

Another method of forming a composite article includes the steps of providing a ceramic body comprising a primary continuous phase including silicon carbide, wherein the first continuous phase defines an interconnected network of pores, and infiltrating the interconnected network of pores with an infiltrant. The infiltrant includes an aluminum-based metal.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to composite bodies including ceramic bodies made of silicon carbide, and particularly including recrystallized silicon carbide. In more particular instances, the following is directed to silicon carbide-based composite articles utilizing recrystallized silicon carbide bodies formed through certain processing such that the body has a certain morphology, including, for example, a high degree of interconnected porosity. The following composite articles may be well suited for use as refractory materials, and a variety of other applications desiring improved impact resistant and wear resistant materials, including for example, pipe liners, pipe chokes, personnel and vehicle armor.

Figure 1:
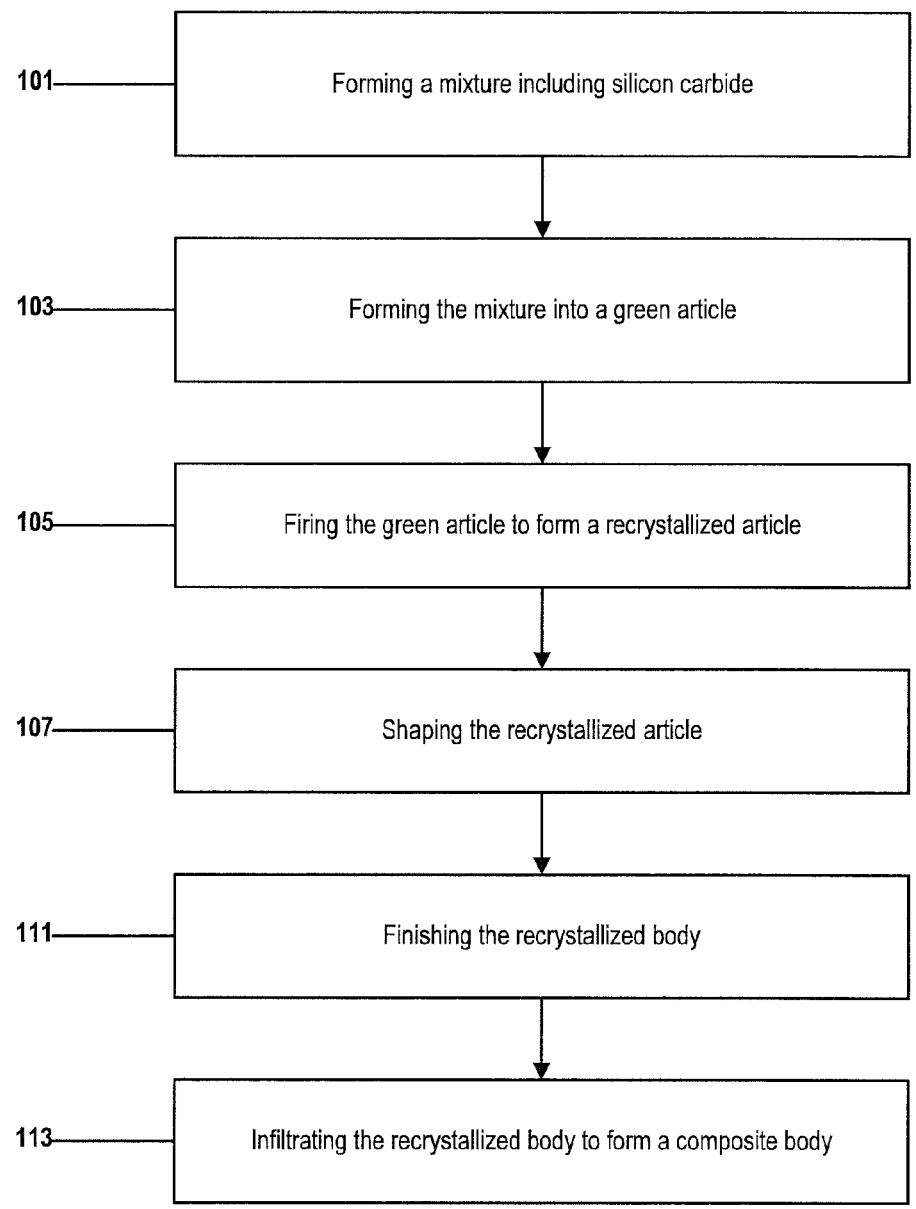
FIG. 1 includes a flow chart illustrating a method of making a composite article according to an embodiment.

FIG. 1 includes a flow chart illustrating a method of forming a composite article in accordance with an embodiment. As illustrated, the process is initiated at step 101 which includes forming a mixture including silicon carbide. The mixture can be a dry powder mixture of silicon carbide powder materials. In other instances, it will be appreciated that the mixture can be a wet mixture utilizing powder components (e.g. silicon carbide powder) and a liquid carrier. The wet mixture can be an aqueous-based mixture utilizing water as the liquid carrier. Other liquid carriers can include other inorganic or organic liquid materials.

In accordance with an embodiment, the mixture including the silicon carbide material can be a mixture including a bimodal distribution of silicon carbide powder sizes. For example, the mixture can include a first silicon carbide powder having a fine grit size and a second silicon carbide powder having a coarse grit size, wherein the coarse powder has an average grit size that is significantly greater than the average grit size of the fine powder material. In accordance with an embodiment, the mixture can be formed such that the coarse silicon carbide powder has an average grit size that is at least 10% larger than an average grit size of the fine silicon carbide powder, wherein the percentage is based upon the smaller of the two grit sizes. The percentage difference in grit sizes can be calculated by the equation $((CP-FP)/FP) \times 100$, wherein CP is the average grit size of the coarse silicon carbide powder and FP is the average grit size of the fine silicon carbide powder.

In other instances, the difference in grit sizes between the coarse silicon carbide powder and the fine silicon carbide powder can be at least about 15%, such as at least about 20%, at least about 25%, at least about 30%, at least about 35%, at least about 40%, at least about 45%, or even at least about 50%. In particular instances, the coarse powder can have an average grit size that is greater than the average grit size of the fine powder within a range between about 10% and about 500%, such as between about 15% and about 400%, between about 20% and about 300%, or even between about 30% and about 200%.

In particular instances, the fine silicon carbide powder can have an average grit size that is not greater than about 20 microns. In other examples, the fine silicon carbide powder can have an average grit size that is less than 20 microns, such as not greater than about 15 microns, not greater than about 10 microns, not greater than about 8 microns, or even not greater than about 5 microns. For particular mixtures, the fine silicon carbide powder can have an average grit size that is at least about 0.1 microns, at least about 0.3 microns, at least about 0.5 microns, or even at least about 0.8 microns. It will be appreciated that the fine silicon carbide powder can have an average grit size within a range between any of the minimum values and maximum values listed above.

The coarse silicon carbide powder can have an average grit size that is at least about 200 microns. In fact, the coarse silicon carbide powder can have an average grit size of at least about 250 microns, at least about 300 microns, at least about 400 microns, at least about 500 microns, or at least about 600 microns. In particular instances, the coarse silicon carbide powder can have an average grit size that is not greater than about 5000 microns, such as not greater than about 2500 microns, or even not greater than about 1500 microns. It will be appreciated that the coarse silicon carbide powder can have an average grit size within a range between any of the minimum values and maximum values listed above.

In certain instances, the mixture can include additional grit sizes of powder materials, such as silicon carbide powder, such that the mixture is a trimodal grit size distribution. For example, such a mixture can include a fine silicon carbide powder, a coarse silicon carbide powder, and an intermediate silicon carbide powder, wherein the intermediate powder has an average grit size between the average grit size of the fine powder and the average grit size of the coarse powder. In particular instances, the coarse silicon carbide powder can have an average grit size that is at least about 5% greater than the average grit size of the intermediate silicon carbide powder, based on the smaller grit size of the two powders (i.e., the intermediate powder). The percentage difference in grit sizes can be calculated by the equation $((CP-IP)/IP) \times 100$, wherein CP is the average grit size of the coarse silicon carbide powder and IF is the average grit size of the intermediate silicon carbide powder.

In other instances, the difference between the average grit size of the coarse powder and average grit size of the intermediate silicon carbide powder can be greater, such as at least about 8%, at least about 10%, at least about 12%, at least about 15%, at least about 20%, at least about 30%, or even at least about 40%. In particular instances, the difference in grit size between the coarse powder and the intermediate powder can be within a range between about 5% and about 100%, such as between about 10% and 100%.

Additionally, the intermediate silicon carbide powder can have an average grit size that is at least about 5% larger than the average grit size of the fine silicon carbide powder, based on the smaller grit size of the two powders (i.e., the fine powder). The percentage difference in grit sizes can be calculated by the equation $((IP-FP)/FP) \times 100$, wherein IP is the average grit size of the intermediate silicon carbide powder and FP is the average grit size of the fine silicon carbide powder. Notably, the percent difference in average grit size between the intermediate powder and the fine powder can be the same as the difference between the coarse powder and the intermediate powder, as noted above.

In particular instances, the intermediate powder can have an average grit size of at least about 40 microns. In other embodiments, the average grit size of the intermediate silicon carbide powder can be greater, such as at least about 50 microns, at least about 60 microns, at least about 80 microns, or even at least about 90 microns. Certain intermediate silicon carbide powders can have an average grit size that is not greater than about 200 microns, such as not greater than about 175 microns, not greater than about 150 microns, not greater than about 125 microns, or even not greater than about 100 microns. It will be appreciated that the intermediate silicon carbide powder can have an average grit size within a range between any of the minimum values and maximum values provided above.

After forming the mixture at step 101, the process can continue at step 103, which includes forming the mixture into a green article. In accordance with one embodiment, the shaping process can include a slip casting process wherein the slurry can be shaped into a body in a gypsum mold. Notably, the slurry can be poured into a plaster (gypsum) mold for casting, wherein the water within the slurry is drawn by capillary action through the gypsum mold, leaving behind a cast product, which is a green article. The green article is an unfinished, unsintered ceramic part. For further details of the techniques for forming the ceramic body, attention is drawn to U.S. Pat. No. 4,990,469, incorporated herein by reference. While slip casting is generally used, other ceramic processing formation techniques can be used. For example, drip casting, pressing, pressure casting, extrusion, and other techniques.

After forming the mixture into a green article at step 103, the process can continue by firing the green article to form a recrystallized article at step 105. Generally, during firing, the green body is heated to a sublimation temperature for a time period of at least 2 hours, and, more particularly, between about 2 to about 20 hours, depending upon the size of the body and the thickness of the wall of the body. By firing the body to a sublimation temperature, the finer particles contained within the original mixture can be turned to a gas phase component, which then preferentially recombine with the large particles of SiC within the body to form larger particles of SiC through a sublimation reaction. Particular firing processes may utilize a sublimation temperature of at least about 1700° C. In other processes, the sublimation temperature can be at least about 1750° C., at least about 1800° C., at least about 1900° C., or even at least about 2000° C. Embodiments herein can utilize a sublimation temperature within a range between about 1700° C. and about 2500° C., between about 1750° C. and about 2400° C. or even between about 1900° C. and about 2400° C.

During firing the atmosphere within the chamber can include an inert gas. In particular, at least a majority of the atmosphere contains an inert gas, and more particularly, the entire atmosphere can consist of an inert gas, such as a noble gas. For example, the atmosphere during heating can consist essentially of argon. Alternatively, a reducing atmosphere may be suitable during heating and, accordingly, a nitrogen-containing atmosphere may be utilized.

After forming the fired article at step 105, the process can continue at an optional step 107 of shaping the recrystallized article. Shaping of the recrystallized article can include removal of particular portions of the body of the recrystallized article to give it a particular shape or contour for a desired application. Various methods can be undertaken to shape the fired article, including, for example, sand blasting, grinding, and other abrasive techniques for rough forming of the article before a finishing process.

The process can continue at step 111 by finishing the recrystallized body. Particularly suitable methods of finishing can include grinding and/or polishing procedures to form a composite article having a body with particular size and contours as desired by the industry.

After finishing of the recrystallized body at step 111, the process can continue at step 113, which includes infiltrating the recrystallized body to form a composite body. In particular, the infiltration process can include placing an infiltrant material in direct contact with the recrystallized body. Moreover, the infiltrating process can further include heat treatment while the infiltrant is in direct contact with the recrystallized body, wherein the temperature within a processing chamber is raised to the melting point of the infiltrant material. At elevated temperatures, particularly the melting temperature of the infiltrant, the infiltrant can change phases from solid to liquid, and infiltrate the recrystallized body. The infiltration process can utilize capillary action, wherein the pores of the recrystallized silicon carbide body are particularly suited to facilitate proper surface tension characteristics between the surfaces of the recrystallized body and the infiltrant and thereby encourage infiltration of the infiltrant into the recrystallized body through capillary action.

The recrystallized body can be formed to have a particular type of porosity, which facilitates infiltration, and particularly facilitates effective and thorough infiltration of the infiltrant throughout the entire volume of the recrystallized silicon carbide body. For example, the recrystallized body is characterized by a high degree of interconnected porosity, wherein the interconnected porosity defines a first continuous phase extending throughout the volume of the body in the form of channels that are connected to each other. The interconnected porosity can exist as an interconnected network of pores that can be filled or infiltrated with the infiltrant, which facilitates distribution of the infiltrant throughout the entire volume of the recrystallized body. In accordance with an embodiment, at least about 50% of the total amount of porosity within the recrystallized body can be interconnected porosity. In other instances, the amount of interconnected porosity is greater, such as at least about 60%, at least about 70%, at least about 80%, at least about 85%, at least about 90%, at least about 95%, or even at least about 98% of the total amount of porosity is interconnected porosity. In one embodiment, essentially all of the porosity within the recrystallized silicon carbide body is interconnected porosity.

Moreover, the porosity of the recrystallized body can be a bimodal distribution of porosity including fine pores and coarse pores, wherein the fine pores have a fine average pore size that is significantly less than the coarse average pore size. According to one embodiment, the coarse average pore size can be at least about 10% larger than the fine average pore size, wherein the percentage is based upon the size of the coarse average pore size, and calculated by the equation $((P_c - P_f)/P_c) \times 100$, wherein $P_c$ is the coarse average pore size and $P_f$ is the fine average pore size. Notably, a bimodal pore size distribution is characterized by a distribution of pore sizes that exhibits two clear and measureable modes of pore sizes, fine pores having a fine average pore size that is significantly less than coarse pores having a coarse average pore size. In particular instances, the coarse average pore size can be at least about 20%, at least about 30%, at least about 40%, at least about 50%, at least about 60%, at least about 70%, at least about 80%, or even at least about 100% greater than the fine average pore size. In other instances, the coarse pore size can be within a range between about 10% and about 500%, such as between about 30% and about 400%, between about 50% and about 400%, between about 80% and about 300%, or even between about 100% and about 300% greater than the fine average pore size.

It will be appreciated that the recrystallized body can have a multimodal pore size distribution, wherein there are greater than simply two modes (i.e., a bimodal distribution) and there may be three or more modes of pore sizes. For example, the recrystallized body can have a trimodal or quadramodal distribution of pore sizes.

Figure 4A:
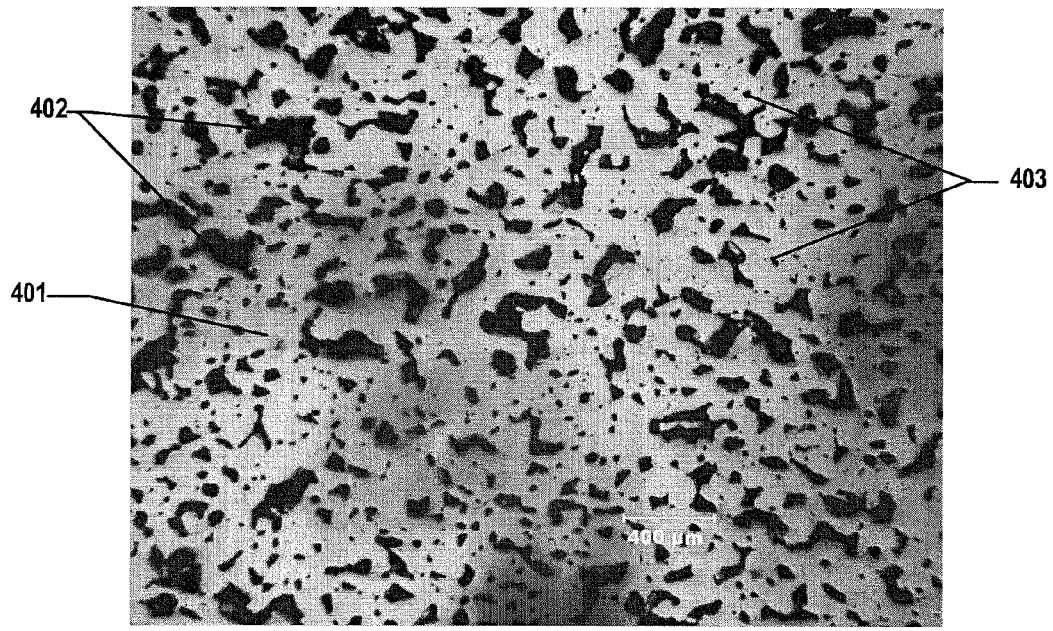
FIGS. 4a-4d include optical images of cross-sections of recrystallized bodies before and after infiltration.
Figure 4B:
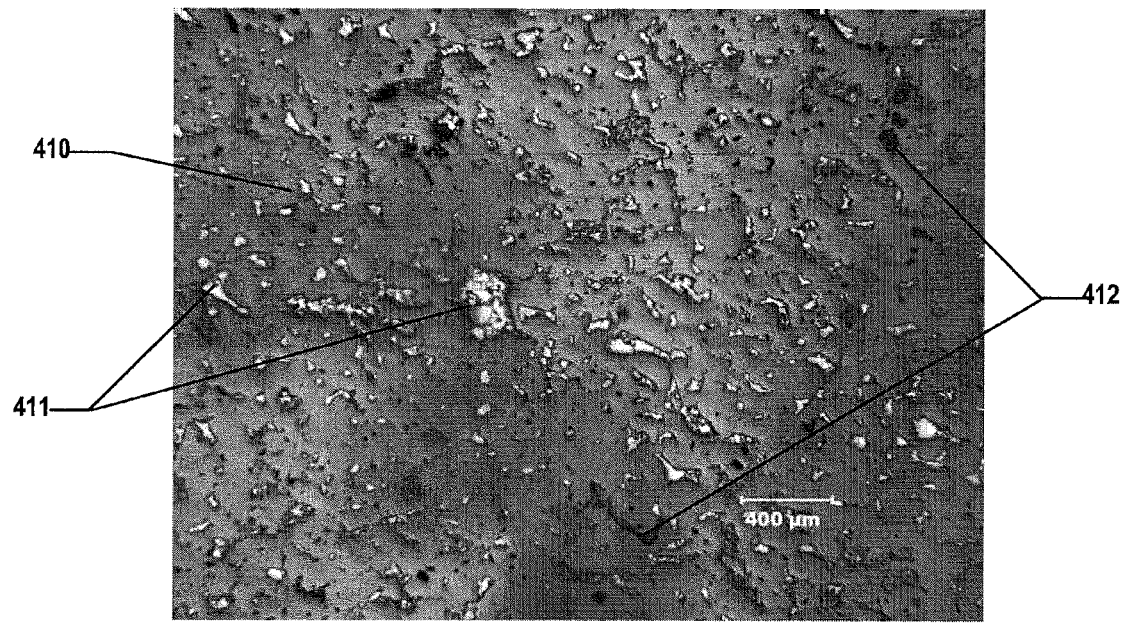
Figure 4C:
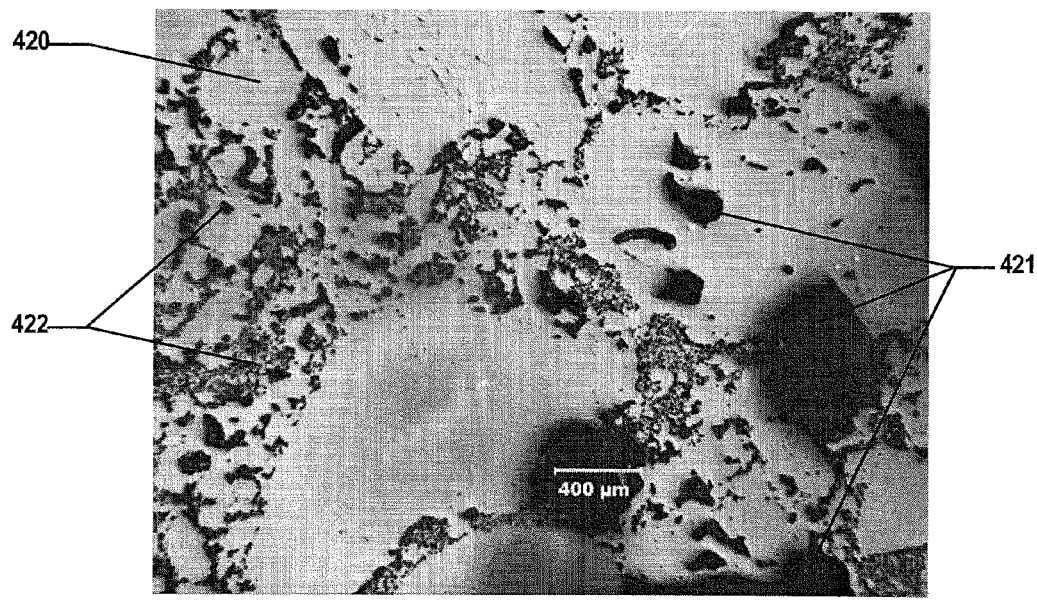

FIGS. 4a-4c include optical images of cross-sections of recrystallized bodies before and after infiltration. FIG. 4a includes an image of a cross-section of a recrystallized body before infiltration. As shown, the body has a first phase defined by the silicon carbide body 401. Additionally, the body includes coarse pores 402 and fine pores 401 distributed throughout the volume of the body 401 and defining an interconnected network of pores that define a second, interconnected phase extending through the volume of the silicon carbide body 401. A pore size measurement using Hg porosimetry was conducted on the sample illustrated in FIG. 4a, and the average pore size was calculated to be approximately 17 microns. Notably, this value is expected to represent the necks of pores that make up the interconnected porosity.

FIG. 4b includes an optical image of a cross-section of a recrystallized body after infiltration. As illustrated, the recrystallized body 410 has a distribution of pores, a majority of which are filled within an infiltrant 411. In particular, upon examination, essentially all of the pores having an average pore size of 200 microns or greater are filled with the infiltrant 411. Moreover, a significant portion, such as at least about 50%, at least about 75%, or even at least about 80% of the pores having a size of 50 microns or greater are filled with the infiltrant 411. Finally, some pores 412, particularly a minor amount of pores within the body 410, and more particularly, pores having an average pore size of less than about 50 microns, are not filled with the infiltrant 411. Such pores may be isolated or closed porosity that may not necessarily be part of the interconnected porosity or network of connected pores within the recrystallized body 410.

FIG. 4c includes an optical image of a cross-section of a recrystallized body before infiltration. As shown, a first phase defined by grains of silicon carbide define the silicon carbide body 420. As compared to FIG. 4a, the recrystallized body 420 is formed of a coarser mix of grains within the original mixture than the body 401, such that the coarse grains within the final body 420 are larger than the coarse grains of the body 401 (FIG. 4a) and the large pores 421 within the recrystallized body 420 are larger than the coarse grains of the recrystallized body 401. Moreover, the recrystallized body 420 comprises fine pores 422, and notably, the fine pores 422 of the body 420 generally have a smaller fine average pore size than the fine pores 403 of the body 401. It is theorized that such a phenomena occurs due to the fact that the body 420 was made to thicker dimensions than the body 401, and not all of the fine grains may have sublimed and recrystallized during firing, leading to a body with a greater distinction between fine pores and coarse pores. A pore size measurement using Hg porosimetry was conducted on the sample illustrated in FIG. 4c, and the average pore size was calculated to be approximately 6 microns. Notably, this value is expected to represent the necks of pores that make up the interconnected porosity.

The pores 421 and 422 of the body 420 can define an interconnected network of pores that define a second, interconnected phase extending through the volume of the silicon carbide body 401. Moreover, the body 420 can have a greater percentage of coarse pores, having a greater average coarse pore size than the coarse pores of the body 401. As illustrated in FIG. 4c, the body 420 can include a greater percentage of coarse pores 421 per unit volume of the body 420, and more particularly, the average pore size of the coarse pores can be greater than the average pore size of the coarse pores of the body 401. For example, the coarse pores 421 of the body 420 can have a coarse average pore size of at least about 250 microns, such as at least about 300 microns, at least about 350 microns, at least about 400 microns, or greater.

Figure 4D:
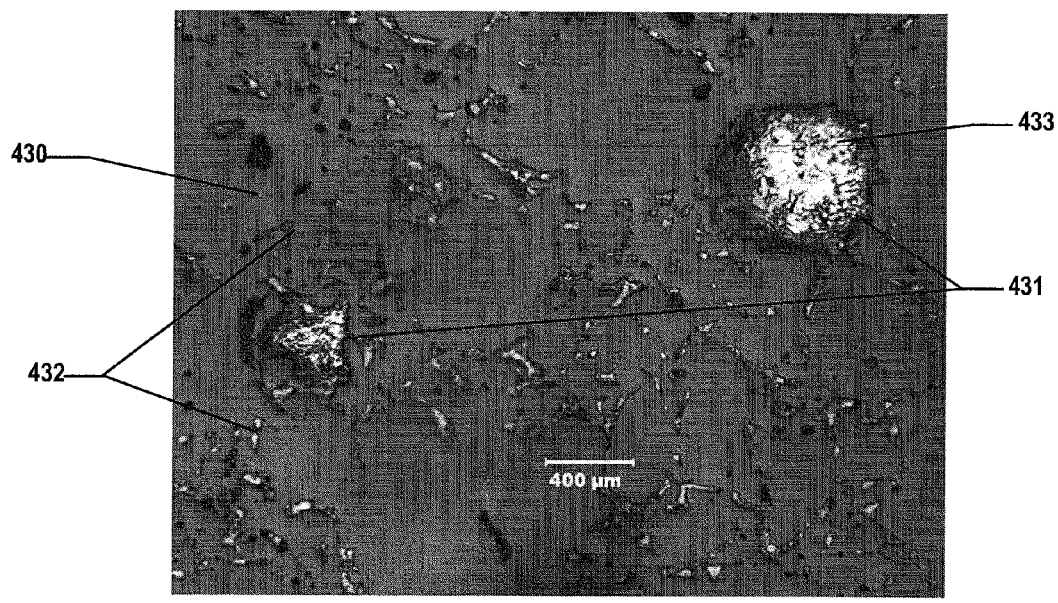

FIG. 4d includes an optical image of a cross-section of a recrystallized body after infiltration. Notably, FIG. 4d includes an illustration of an infiltrated recrystallized silicon carbide body made from a coarse grained mixture, such as the body illustrated in FIG. 4c. As illustrated, after the infiltration process, a majority of the pores, including the coarse pores 431 and fine pores 432 within the recrystallized body 430 are filled within the infiltrant 433. In particular, upon examination, essentially all of the pores having an average pore size of 200 microns or greater are filled with the infiltrant 433. Moreover, a significant portion, such as at least about 50%, at least about 75%, or even at least about 80% of the pores having a size of 100 microns or greater are filled with the infiltrant 433. Finally, some pores, particularly a minor amount of pores within the body 430, and, more particularly, pores having an average pore size of less than about 100 microns, may not necessarily be filled with the infiltrant 433. Such pores may be isolated or closed porosity that may not necessarily be part of the interconnected porosity or network of connected pores within the recrystallized body 430. Notably, essentially all of the pores forming the interconnected porosity are filled with the infiltrant.

In accordance with a particular embodiment, the infiltrating process includes heating of the recrystallized silicon carbide body and the infiltrant to an infiltration temperature of at least about 700° C. In other embodiments, the infiltration temperature can be greater, such as at least about 800° C., at least about 850° C., or even at least about 900° C. In particular instances, the infiltration process can be conducted at an infiltration temperature within a range between about 700° C. and about 1300° C., such as between about 800° C. and about 1200° C., or even between about 850° C. and about 1150° C.

The infiltration process can be conducted for an infiltration duration, which is a measure of the time at which the recrystallized body and infiltrant material are held at the infiltration temperature. The infiltration duration can ensure proper infiltration of the infiltrant throughout the entire volume of the recrystallized body. In accordance with an embodiment, the infiltration duration can be at least about 15 minutes. In other instances, the infiltration duration can be at least about 20 minutes, such as at least about 40 minutes, at least about an hour, or even at least about 2 hours. In particular instances, the infiltration duration is within a range between about 15 minutes and about 12 hours, such as between about 1 hour and 5 hours, or even between about 1 hour and 4 hours.

The infiltration process may be conducted in a particular atmosphere. For example, the atmosphere during infiltration can be a reducing atmosphere. In other instances it may be an inert atmosphere. In still other instances, the atmosphere can be controlled to be a combination of inert and reducing atmospheres at particular intervals during infiltration. For example, in one instance, during a first phase of infiltration, such as at a first select temperature of below about 600° C. or even at temperatures of below about 575° C., the atmosphere can include an inert gas. The first select temperature may be selected based upon the melting temperature of the infiltrant material. Suitable inert gases can include noble gases, such as argon. After the first phase, and after heating the chamber to a temperature above the first select temperature, the atmosphere can be altered. For example, a second gas species may be introduced in a second phase at a second select temperature above about 575° C., or above about 600° C. The second gas species can be flowed into the chamber to combine or completely replace the first gas species introduced in the first phase. One suitable gas for the second phase can include nitrogen, and during the second phase, the atmosphere may consist essentially of nitrogen.

During infiltration, the gas species of the first and/or second phases can be flowed through the infiltration chamber at a particular flow rate. Such a flow rate may ensure that a certain volume of gas is exchanged within the processing chamber and proper infiltration of the recrystallized silicon carbide body is achieved. In one embodiment, the flow rate of the gas during infiltration can be at a rate of not less than about 2 standard liters per minute (SLPM) for a chamber having a volume of 1.25 m³. In other instances, the flow rate may be greater, such as not less than about 2.5 SLPM, not less than about 3 SLPM, not less than about 4 SLPM, or even not less than about 5 SLPM. Still, the flow rate may be not greater than about 25 SLPM, not greater than about 20 SLPM, not greater than about 18 SLPM, or even not greater than about 15 SLPM. Moreover, the flow rate used during first and/or second phases of infiltration may be within a range between any of the minimum or maximum values noted herein.

Moreover, in certain operations, the infiltration process can be a pressure-less infiltration process. For example, the infiltrant may not necessarily be pressed into the recrystallized silicon carbide body. In fact, the infiltration process may be an atmospheric gravitational infiltration process, wherein the pressure of the atmosphere within the infiltration chamber is about atmospheric pressure and infiltration is based upon the use of gravity and capillary action to draw the infiltrant into the recrystallized silicon carbide body. Certain processes may utilize a ram or other device to assist infiltration. And in still other instances, the pressure can be greater or less than atmospheric pressure within the infiltration chamber.

The infiltrant material can be a particular metal or metal alloy. Some suitable infiltrants can include aluminum, silicon, and a combination thereof. In one particular embodiment, the infiltrant can be an aluminum-based metal. As will be appreciated, an aluminum-based metal is a metal that contains a majority content of aluminum (greater than 50%) as compared to any other metal species present within the compound or alloy. In accordance with an embodiment, the infiltrant comprises at least 51% aluminum. In other embodiments, the content of aluminum can be greater, such as at least about 55%, such as at least about 60%, at least about 65%, at least about 68%, at least about 72%, or even at least about 75%.

Additionally, the infiltrant can be a material including elements from Group 1A, Group 2A, and transition metal species from the Periodic Table of Elements. Notably, the infiltrant can be an aluminum-based material including minor amounts of other elements or compounds made of elements from Group 1A, Group 2A, and transition metal species. According to one particular embodiment, the infiltrant can be an aluminum-based alloy that further includes silicon, magnesium, and a combination thereof.

A certain content of Group 2A materials within the composition of the infiltrant can facilitate infiltration. In accordance with an embodiment, the infiltrant includes at least about 1% magnesium. In other embodiments, the content of magnesium within the infiltrant can be greater, such that it is at least about 2%, at least about 3%, at least about 4%, at least about 5%, or even at least about 6% magnesium. Still, the infiltrant can contain not greater than about 20% magnesium, such as not great than about 18% magnesium, not greater than about 15% magnesium, or even not greater than about 12% magnesium. It will be appreciated that the amount of magnesium within the infiltrant can be within a range between any of the minimum values and maximum values noted above.

In accordance with another embodiment, the infiltrant can include a particular content of silicon, which may facilitate infiltration within the silicon carbide recrystallized body. In accordance with an embodiment, the amount of silicon within the infiltrant can be at least about 1%, such as at least about 3%, at least about 5%, at least about 8%, or even at least about 10%. Still, the amount of silicon within the infiltrant material may be limited, such that it is not greater than about 30%, not greater than about 28%, not greater than about 25%, not greater than about 22%, or even not greater than about 20%. It will be appreciated that the amount of silicon present within the infiltrant can be within a range between any of the minimum values and maximum values noted above.

According to one particular embodiment, the infiltrant can include an aluminum-based metal alloy having a composition including 70-85% aluminum, 10-15% silicon, and 5%-15% magnesium such that the amount of aluminum, silicon, and magnesium account for 100% of the composition, excluding trace amounts (i.e., less than 0.5%) of other elements. In other instances, the infiltrant composition can be: 72-83% aluminum, 11-15% silicon, and 7%-14% magnesium or 76-80% aluminum, 11-14% silicon, and 7%-11% magnesium.

Other particular aspects of the infiltrant material include certain physical properties, including a particular content of plastic behavior under stress. For example, the infiltrant can include a material having a plastic strain at failure of at least 0.1% as measured according to a 3-point bend test according to ASTM 1161 (Flexure Strength of Advanced Ceramics at Ambient Temperature) with modifications including a sample size of 8×8 mm and without the use of an articulating fixture. In other embodiments, the infiltrant can have a plastic strain at failure of at least about 0.15%, at least about 0.2%, at least about 0.3%, at least about 0.4%, at least about 0.5%, or even at least about 0.8%. According to one embodiment, the infiltrant material can have a plastic strain at failure within a range between about 0.15% and about 10%, such as between about 0.2% and about 10%, between about 0.2% and about 8%, between about 0.2% and about 7%, between about 0.4% and about 7%, between about 0.4% and about 6%, or even between about 0.5% and about 5%, as measured according to a 3-pointbend test according to ASTM 1161.

Notably, the plastic behavior of the infiltrant material is distinct from brittle materials, such as certain intermetallic materials, which are brittle materials having a 0% plastic strain at failure. Moreover, unlike pure silicon materials and intermetallics, in certain exemplary embodiments, the infiltrant of the embodiments herein can be essentially inert with respect to chemical components of the recrystallized silicon carbide body. For instance, the infiltrant can be chemically inert with respect to the silicon carbide within the body, such that it does not chemically react with the silicon carbide in a manner to form a reaction product, thereby decreasing the volume content of the infiltrant material or chemically altering the properties of the infiltrant or silicon carbide. Accordingly, the infiltrant can be inert, and thus, a distinct, unreacted phase within the composite body, suitably filling a majority of the pores, substantially all of the pores, or essentially all of the pores of the recrystallized silicon carbide body.

It should be noted that in testing of the infiltrant material, a $K_{1c}$ fracture toughness by indentation could not be measured on the infiltrant material, since such a test is typically reserved for brittle materials, and the infiltrant was not sufficiently brittle to aptly measure the toughness using the indentation technique. Still, the $K_{1c}$ toughness of the infiltrant can be at least about 5 MPa m$^{1/2}$ as measured according to ASTM standard E399, which is a chevron-notch fracture test. In certain other embodiments, the $K_{1c}$ toughness of the infiltrant can be greater, such that it is as at least about 6 MPa m$^{1/2}$, at least about 8 MPa m$^{1/2}$, at least about 9 MPa m$^{1/2}$, at least about 10 MPa m$^{1/2}$, at least about 12 MPa m$^{1/2}$, at least about 14 MPa m$^{1/2}$, or even at least about 16 MPa m$^{1/2}$ as measured according to ASTM standard E399. In particular instances, the $K_{1c}$ toughness of the infiltrant material can be within a range between about 5 MPa m$^{1/2}$ and about 50 MPa m$^{1/2}$, such as between about 5 MPa m$^{1/2}$ and about 40 MPa m$^{1/2}$, between about 6 MPa m$^{1/2}$ and about 40 MPa m$^{1/2}$, such as between about 7 MPa m$^{1/2}$ and about 40 MPa M$^{1/2}$, such as between about 8 MPa m$^{1/2}$ and about 40 MPa m$^{1/2}$, or between about 5 MPa M$^{1/2}$ and 30 MPa m$^{1/2}$, or between about 5 MPa m$^{1/2}$ and about 25 MPa m$^{1/2}$, between about 7 MPa m$^{1/2}$ and about 25 MPa m$^{1/2}$ as measured according to ASTM standard E399.

In other embodiments, the infiltrant can be a material having a density of at least about 2.0 g/cm$^3$. In other embodiments, the density can be greater, such that it is at least about 2.2 g/cm$^3$, such as at least about 2.3 g/cm$^3$, or even at least about 2.4 g/cm$^3$. In particular instances, the infiltrant can have a density within a range between about 2.0 g/cm$^3$ and about 4.0 g/cm$^3$, such as between about 2.3 g/cm$^3$ and about 3.0 g/cm$^3$, or even between about 2.4 g/cm$^3$ and about 2.8 g/cm$^3$.

In certain instances, the infiltrant can include a material that can be essentially free of particular materials, including for example, particular transition metal elements. For example, the infiltrant can be essentially free of iron. In other instances, the infiltrant can be essentially free of titanium. In still other compositions, the infiltrant can be essentially free of nickel. It will be appreciated that reference to a material being essentially free of such elements denotes that the identified elements are not present in an amount greater than an impurity content, which is typically less than 1%, and more typically less than 0.5%.

Upon completing the infiltration process, a composite body is formed that can include a first phase defined by the structure of the recrystallized silicon carbide body. As will be appreciated, and described herein, the recrystallized silicon carbide body is characterized by a high percentage of interconnected porosity, which is a network of connected channels extending through the volume of the recrystallized silicon carbide body. During infiltration, the interconnected porosity is utilized by the infiltrant to wick into the recrystallized silicon carbide body such that essentially all of the porosity is filled with the infiltrant. Accordingly, the composite article can be described by a second phase, notably the infiltrant, which is an interconnected network of material extending through the continuous network of recrystallized silicon carbide. As such, the composite body is defined by two distinct phases that are interconnected phases, a first phase of silicon carbide and a second phase of an infiltrant.

In accordance with one embodiment, the composite body can be a silicon-carbide-based composite, such that the majority of the body, as measured in vol %, comprises silicon carbide. In particular embodiments, the composite body can include at least 63 vol % silicon carbide for the total volume of the body. In other instances, the amount of silicon carbide can be greater, such as at least about 70 vol %, at least about 73 vol %, at least about 75 vol %, at least about 77 vol %, or even at least about 80 vol %. In other embodiments, the composite body is formed such that it can include not greater than about 95 vol % silicon carbide for the total volume of the body. Still, the total content of silicon carbide within the composite body can be less, such as not greater than about 90 vol %, not greater than about 88 vol %, or even not greater than about 85 vol %. It will be appreciated that the amount of silicon carbide within the composite body can be within a range between any of the minimum values and maximum values noted above.

According to another embodiment, the composite body is formed such that it contains at least 5 vol % infiltrant for the total volume of the body. In fact, the composite body can be formed to have a greater amount of infiltrant, such that it contains at least about 8 vol %, at least about 10 vol %, at least about 12 vol %, at least about 15 vol %, at least about 18 vol %, or even at least about 20 vol %. According to other embodiments, the composite body can be formed such that it contains not greater than about 30 vol % infiltrant. Particular composite bodies may contain less infiltrant, such that the body may contain not greater than about 28 vol %, not greater than about 25 vol %, or not greater than about 22 vol %, infiltrant for the total volume of the composite body. It will be appreciated that the total amount of infiltrant within the body can be between any of the minimum values and maximum values noted above.

The recrystallized silicon carbide portion of the composite body may be characterized by a particular morphology. In particular, the recrystallized silicon carbide body can have a structure defined by a bimodal grain size distribution, which may be based upon an original bimodal distribution of silicon carbide powder grains incorporated within the initial mixture. As such, the final recrystallized silicon carbide form can be characterized by differences in grain sizes commensurate with the difference in powder grit sizes noted above with regard to the mixture.

For example, the final-formed recrystallized silicon carbide portion of the composite body can have a bimodal distribution of silicon carbide grain sizes. Accordingly, the body can include fine silicon carbide grains having a fine average grain size and coarse silicon carbide grains having a coarse average grain size, wherein the coarse grains have an average grain size that is significantly greater than the average grain size of the fine silicon carbide grains. Such distinctions are readily identifiable through a microscope.

In accordance with an embodiment, the coarse silicon carbide grains have an average grain size that is at least 10% larger than an average grain size of the fine silicon carbide grains, wherein the percentage is based upon the smaller of the two grain sizes (i.e., the fine silicon carbide grains). The percentage difference in grain sizes can be calculated by the equation $((CG-FG)/FG) \times 100$, wherein CG is the average grain size of the coarse silicon carbide grains and FG is the average grain size of the fine silicon carbide grains. In other instances, the difference in grain sizes between the coarse grains and the fine grains of silicon carbide can be at least about 15%, such as at least about 20%, at least about 25%, at least about 30%, at least about 35%, at least about 40%, at least about 45%, or even at least about 50%. In particular instances, the coarse grains of silicon carbide have an average grain size that is within a range between about 10% and about 100,000%, such as between about 100% and about 50000%, between about 200% and about 40,000%, or even between about 500% and about 35000% of the average grain size of the fine silicon carbide grains.

In particular instances, the fine silicon carbide grains can have an average grain size that is not greater than about 20 microns. In other examples, the fine silicon carbide can have an average grain size that is less, such as not greater than about 15 microns, not greater than about 10 microns, not greater than about 8 microns, or even not greater than about 5 microns. Still, for particular mixtures, the fine silicon carbide grains can have an average grain size that is at least about 0.1 microns, at least about 0.3 microns, at least about 0.5 microns, or even at least about 0.8 microns. It will be appreciated that the fine silicon carbide can have an average grain size within a range between any of the minimum values and maximum values listed above.

The coarse silicon carbide grains can have an average grain size that is at least about 200 microns. In fact, the coarse silicon carbide can have an average grain size of at least about 250 microns, at least about 300 microns, at least about 400 microns, at least about 500 microns, at least about 600 microns, or even at least about 800 microns. In particular instances, the coarse silicon carbide can have an average grain size that is not greater than about 5000 microns, such as not greater than about 2500 microns, not greater than about 1500 microns, or not greater than about 1200 microns. It will be appreciated that the coarse silicon carbide can have an average grain size within a range between any of the minimum values and maximum values listed above.

In certain instances, the mixture can include additional sizes of silicon carbide grains, such that a trimodal grain size distribution exists. For example, such a mixture can include fine grains, coarse grains, and intermediate grains of silicon carbide wherein the intermediate grains have an average grain size between the average grain size of the fine grains and the coarse grains. In particular instances, the coarse silicon carbide grains can have an average grain size that is at least about 5% greater than the average grain size of the intermediate grains of silicon carbide. The percentage difference in grain sizes can be calculated by the equation $((CG-IG)/IG) \times 100$, wherein CG is the average grain size of the coarse silicon carbide grains and IG is the average grain size of the intermediate silicon carbide grains. In other instances, the difference between the average grain size of the coarse grains and the average grain size of the intermediate grains can be greater, such as at least about 8%, at least about 10%, at least about 12%, at least about 15%, at least about 20%, at least about 30%, or even at least about 40%. In particular instances, the difference in grain size between the coarse-grained silicon carbide and the intermediate-grained silicon carbide can be within a range between about 5% and about 1000%, such as between about 10% and 1000%.

Additionally, the intermediate grain silicon carbide can have an average grain size that is at least about 5% larger than the average grain size of the fine silicon carbide grains, based on the smaller grain size (i.e., fine silicon carbide grains). The percentage difference in grain sizes can be calculated by the equation $((IG-FG)/FG) \times 100$, wherein IG is the average grain size of the intermediate silicon carbide grains and FG is the average grain size of the fine silicon carbide grains. Notably, the percent difference in average grain size between the intermediate silicon carbide grains and the fine silicon carbide grains can be the same as the difference between the coarse silicon carbide grains and the intermediate silicon carbide grains as noted above.

In particular instances, the intermediate-grained silicon carbide can have an average grain size of at least about 40 microns. In other embodiments, the average grain size of the intermediate-grained silicon carbide can be greater, such as at least about 50 microns, at least about 60 microns, at least about 80 microns, or even at least about 90 microns. Certain intermediate-grained silicon carbide can have an average grain size that is not greater than about 200 microns, such as not greater than about 175 microns, not greater than about 150 microns, not greater than about 125 microns, or even not greater than about 100 microns. It will be appreciated that the intermediate-grained silicon carbide can have an average grain size within the range between any of the minimum values and maximum values provided above.

While the first phase of the body defined by the recrystallized silicon carbide body may have a bimodal or trimodal distribution of grain sizes, in particular instances, the recrystallization process can facilitate the formation of a generally monomodal distribution of grain sizes. That is, the fine grain material may be recrystallized with larger grains within the mixture, thus facilitating a recrystallized silicon carbide body made of silicon carbide grains having an average grain size of at least the intermediate-grained silicon carbide or even the coarse-grained silicon carbide.

The composite body can have particular mechanical features making it suitable for a variety of uses. For example, the body can have a static impact resistance of at least about 1800 MPa, wherein the static impact resistance is a stress value measured by impacting a ball of known dimensions under a known force against the surface of the body. See, Evans, J. Am. Cer. Soc. 56, 8 p. 405 (1973). In testing the samples for static impact resistance, each sample composite body is ground and polished to a mirror finish, so cracks created during testing are visible. A tungsten carbide probe ball of 0.25 inch diameter is placed against the surface of the material at random places under a known force applied to the ball at a direction normal to the surface of the composite body. The ball is pressed against successive, random locations under increasing force until cracks appear. The minimum force necessary to create a visible crack ring is known and the stress to create the crack ring is calculated and reported as the static impact resistance.

In some instances, the composite body can demonstrate static impact resistance of at least about 1850 MPa, such as at least about 1950 MPa, at least about 2000 MPa, at least about 2050 MPa, at least about 2100 MPa, or even at least about 2150 MPa. In other instances, the static impact resistance of the composite body may be not greater than about 2575 MPa, such as not greater than about 2500 MPa, not greater than about 2450 MPa, not greater than about 2400 MPa, or even not greater than about 2350 MPa. It will be appreciated that the static impact resistance of the body can be a stress value within a range between any of the minimum values and maximum values noted above.

Furthermore, the composite body of exemplary embodiments herein can have an improved wear resistance over other recrystallized silicon carbide materials and composite bodies. For example, the composite body can have a wear rate of not greater than about 0.2 $mm^3/g$. The wear rate is measured according to ASTM G76-07 Standard Test Method for Conducting Erosion Tests by Solid Particle Impingement Using Gas Jets. In certain instances, the composite body can have a wear rate of not greater than about 0.15 $mm^3/g$, such as not greater than about 0.13 $mm^3/g$, or even not greater than about 0.10 $mm^3/g$. Still, the wear rate of the composite body may be at least about 0.02 $mm^3/g$, such as at least about 0.03 $mm^3/g$. It will be appreciated that the wear rate of the body may be expressed as a value within a range between any of the minimum values and maximum values noted above.

In other instances, the composite body described according to embodiments herein can have an improved modulus of rupture (MOR) as measured according to a 3-point bend test under ASTM 1161 at room temperature, wherein at least 5 samples, having an average width of approximately 5.9 mm and an average depth of approximately 4.0 mm, are tested and the results are averaged. For example, the composite body can have a MOR of at least about 90 MPa, such as at least about 100 MPa, at least about 110 MPa, at least about 120 MPa, at least about 130 MPa, at least about 140 MPa, at least about 150 MPa, or even at least about 160 MPa. In particular instances, the MOR of the composite body can be not greater than about 400 MPa, such as not greater than about 350 MPa, not greater than about 300 MPa, such as not greater than about 250 MPa, not greater than about 240 MPa, not greater than about 230 MPa, not greater than about 220 MPa. Still, in for at least one particular embodiment, the modulus of rupture can be not greater than about 200 MPa, not greater than about 190 MPa, not greater than about 180 MPa, or even not greater than about 170 MPa. It will be appreciated that the MOR value of the composite body may be expressed as a value within a range between any of the minimum values and maximum values noted above.

The composite body may have a particular cross-sectional shape. For example, the composite body may have a polygonal cross-sectional shape, including but not limited to, a rectangular cross-sectional shape, a circular cross-sectional shape, a triangular cross-sectional shape, or the like. In other instances, due to the forming methods utilized in constructing the recrystallized silicon carbide body, the composite body may have a complex geometry. That is, the body may have a geometry that cannot be explained as a simple polygonal shape as viewed in cross-section.

For instance, in certain embodiments the composite body may be formed to have a shape including a length (L), a thickness (T), and a width (W) wherein the length can be greater than or equal to the width, and the width can be greater than or equal to the thickness. In particular instances, the length may be equal to the width, which may be equal to the thickness such that the composite body is generally a cube. Still, in other instances the length can be greater than the width, such as at least about 2 times greater, such as at least about 3 times greater, or even at least about 5 times greater than the width. Moreover, in other instances the width can be significantly greater than the thickness, such that it is at least 2 times greater, at least about 3 times greater, or even at least about 5 times greater than the thickness.

In other instances, the body can have a generally circular cross-sectional shape which may be defined by a diameter. The composite body can be in the form of a sphere, ellipse, or ellipsoid shape. Still in other instances, the composite body can be in the form of a disk or cylindrical shape. In such instances, the body has a diameter (D) and a thickness (T), wherein the diameter may be greater than or equal to the thickness. In accordance with one embodiment, the composite body has a thickness of at least about 0.65 cm, such as at least about 0.7 cm, at least about 0.8 cm, or at least about 0.9 cm. In fact, in certain instances the body can have a thickness of at least about 1.50 cm.

EXAMPLES

A sample (Sample 1) of an infiltrated, recrystallized silicon carbide body is created according to the following process. A mixture is created comprising silicon carbide powder of two different average particle sizes, 37 wt % of a fine silicon carbide powder having an average particle size of approximately 3 microns (commercially available as FCP07 powder from Saint-Gobain Corporation) and 56 wt % coarse silicon carbide powder having an average particle size of approximately 1000 microns (commercially available as 16f SiC powder from Saint-Gobain Corporation). The mixture further includes a liquid vehicle of deionized water for suspension of the silicon carbide powders to form a wet mixture. 5-10% additives, including sodium hydroxide, sodium silicate, are also provided in the mixture.

After thoroughly mixing the mixture, sample bars are made of the material via slip casting. After casting, the bodies are removed and dried to form green bodies. After drying, the green body is fired to a temperature of approximately 2100° C. for a duration of about 2 hours in an argon atmosphere. The body of Sample 1 is then infiltrated with an aluminum-based infiltrant made of 78% aluminum, 13% silicon, and 9% magnesium. Infiltration includes heating during a first phase to a temperature around 600° C. in an argon atmosphere, and then heating in a second phase to a temperature of approximately 900° C. in a nitrogen atmosphere until infiltration is completed. The composite body formed from infiltration of the recrystallized silicon carbide body is then cooled.

Figure 2:
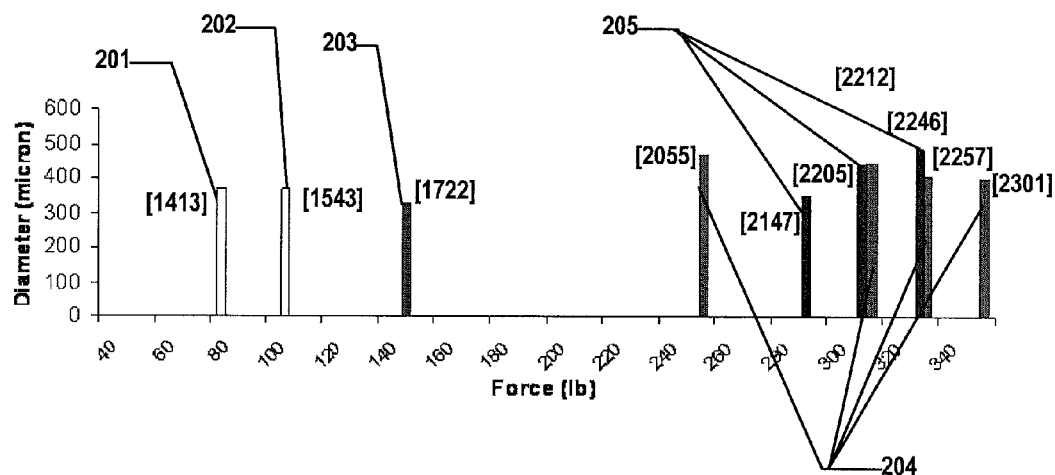
FIG. 2 includes a plot of diameter versus force to open a first ring of crack (i.e., static impact resistance) for Sample 1 and certain comparative conventional samples FIG. 3 includes a plot of wear resistance as measured via a sandblasting test under the ASTM G76-07 Standard Test (Method for Conducting Erosion Tests by Solid Particle Impingement Using Gas Jets) for Sample 1 and certain comparative conventional samples of FIG. 2.

Static impact testing is conducted on Sample 1 as well as other conventional silicon carbide materials according to the methods disclosed herein. The value of static impact resistance (i.e., stress) is provided in FIG. 2 for each of the samples within the brackets associated with each plot. FIG. 2 includes a plot of diameter versus force to open a first crack ring in the sample (i.e., static impact resistance) for Sample 1 and certain comparative conventional samples. Plot 201 represents a conventional silicon carbide body commercially available as Hexoloy® from Saint-Gobain Corporation. Plot 202 represents a conventional silicon carbide body commercially available as Silit® from Saint-Gobain Corporation. Plot 203 represents a conventional silicon carbide body commercially available as Crystar® from Saint-Gobain Corporation. Plot 204 represents the static impact resistance of Sample 1. Plot 205 represents a silicon carbide body (not recrystallized) infiltrated with a metal containing aluminum, commercially available as Alanx 2k+ from Alanx Wear Solutions Newark, Del. or alternatively available from MCubed from Monroe, Conn.

As illustrated in FIG. 2, Sample 1 has a significantly greater static impact resistance than the conventional silicon carbine materials represented in plots 201-203. Notably, four tests were conducted on Sample 1, and the static impact resistance was calculated in each test to be 2055 MPa, 2212 MPa, 2257 MPa, and 2301 MPa, for an average static impact resistance of 2206 MPa. The static impact resistance is calculated from the measured force necessary to cause a crack in the sample body as described herein. Likewise, three tests were conducted on the Alanx 2k++ sample, which is calculated to have an average static impact resistance of 2199 MPa. Notably, Sample 1 had a greater average static impact resistance as compared to the average static impact resistance of the Alanx 2k+ sample.

Figure 3:
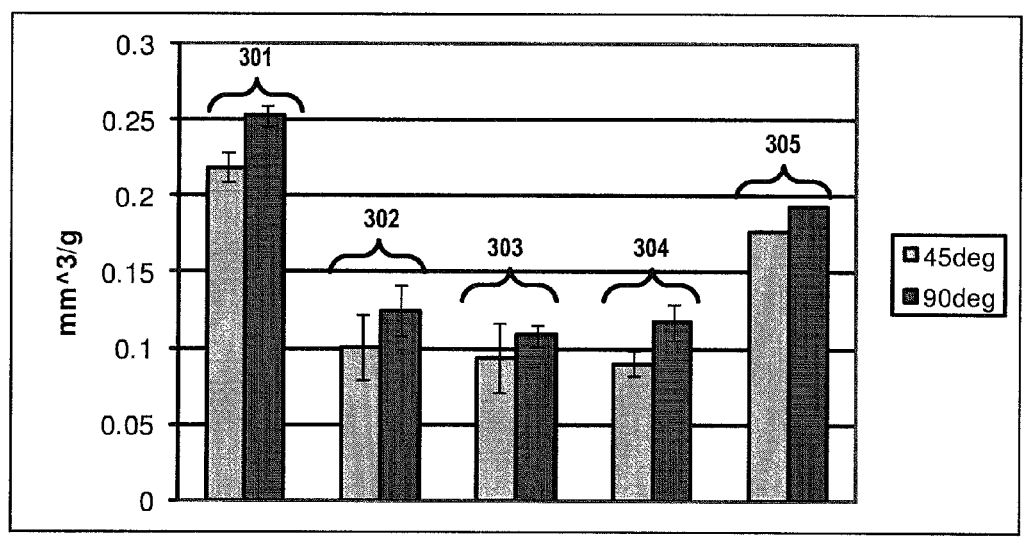

FIG. 3 includes a plot of wear resistance as measured via a sandblasting test under the ASTM G76-07 Standard Test Method for Conducting Erosion Tests by Solid Particle Impingement Using Gas Jets.

For the sandblasting test procedure, pressurized air at approximately 20 psi is used to impact abrasive grains of fused alumina against the surfaces of the samples at either 45 or 90 degrees. The weight loss of the samples is tracked over a series of blasts to give an indication of wear resistance. The data is plotted as volume loss of target per mass of abrasive grit, as a means to normalize samples of different density. Notably, the less mass lost, the better the wear resistance.

Sample 301 is a standard of dense alumina, used as a machine calibration. Sample 302 is a non infiltrated, recrystallized silicon carbide body (Crystar®) product available from Saint-Gobain Corporation. Sample 303 corresponds to Sample 1 above and is a recrystallized silicon carbide body infiltrated with an aluminum-based alloy. Sample 304 is also a recrystallized silicon carbide body infiltrated with an aluminum-based alloy. Sample 304 has a coarser-grained microstructure than Sample 303. Sample 305 corresponds to an Alanx 2k+ commercially available aluminum infiltrated silicon carbide body (not recrystallized).

Notably, Samples 303 and 304, manufactured according to the methods herein and representing the composite materials of embodiments herein, demonstrate improved wear resistance as compared to all other conventional samples (i.e., Sample 301, 302, and 305). It is noteworthy that the composite materials herein demonstrate improved static impact resistance and improved wear resistance since typically, an improvement in one of said parameters results in a decrease in the other parameter. That is, an improvement in both parameters was quite unexpected.

The embodiments herein are directed to a composite article utilizing a re-crystallize silicon carbide body that includes an infiltrant dispersed throughout the recrystallized silicon carbide body. The embodiments herein are directed to a combination of features including use of particular materials, such as infiltrant compositions, silicon carbide materials and morphologies, particular types of porosity, sizes of silicon carbide grains, dimensional characteristics, absence of certain materials (i.e., elements and/or compounds) and mechanical properties that represent a departure from the state-of-the-art.

Silicon carbide bodies have been utilized in various prior art structures. Generally, however, such materials have been limited to pure recrystallized silicon carbide, or recrystallized silicon carbide bodies having a surface layer of material. The surface layer of material is not an infiltrant because it does not penetrate the full volume of the body, and also does not form a continuous phase of material extending through the silicon carbide body. Others have made attempts to infiltrate silicon carbide bodies with certain materials, particularly intermetallic compositions. (See, for example, "Melt Infiltration of Selected Intermetallics into SiC", by Rawers et al., U.S. Dept. of the Int., Journal of Materials Science Letters 9, pages 503-505 (1990)). Such intermetallic compositions are brittle and such materials have limited toughness and durability.

The embodiments provide a combination of features, which can be combined in various manners to describe and define the bonded abrasive articles of the embodiments. The description is not intended to set forth a hierarchy of features, but different features that can be combined in one or more manners to define the invention.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The disclosure is submitted with the understanding that it will not be used to interpret or limit the scope or meaning of the claims. In addition, in the foregoing disclosure, various features may be grouped together or described in a single embodiment for the purpose of streamlining the disclosure. This disclosure is not to be interpreted as reflecting an intention that the embodiments herein limit the features provided in the claims, and moreover, any of the features described herein can be combined together to describe the inventive subject matter. Still, inventive subject matter may be directed to less than all features of any of the disclosed embodiments.

What is claimed is:

1. A composite article comprising:
   a body including a matrix comprising recrystallized silicon carbide and an infiltrant within pores of the matrix, wherein:
   the infiltrant comprises a metal alloy having 70% to 85% aluminum, 10% to 15% silicon, and 5% to 15% magnesium;
   the body has an interconnected porosity that is substantially filled with the infiltrant;
   a portion of the recrystallized silicon carbide is exposed along a surface of the body; and
   the body comprises a static impact resistance of at least 1800 MPa.

2. The composite article of claim 1, wherein the metal alloy has 76% to 80% aluminum, 11% to 14% silicon, and 7% to 11% magnesium.

3. The composite article of claim 1, wherein the static impact resistance is not greater than 2575 MPa.

4. The composite article of claim 1, wherein the body comprises a wear rate not greater than about 0.20 mm$^3$/g as measured according to ASTM G76-07.

5. The composite article of claim 4, wherein the body comprises a wear rate of at least about 0.02 mm$^3$/g.

6. The composite article of claim 1, wherein the body comprises at least about 5 vol % and not greater than about 30 vol % infiltrant for the total volume of the body.

7. The composite article of claim 1, wherein the infiltrant comprises a material having a plastic strain at failure of at least 0.1% as measured according to a 3-point bend test according to ASTM 1161.

8. The composite article of claim 7, wherein the plastic strain at failure is within a range between about 0.15% and about 10% according to ASTM 1161.

9. A composite article comprising:
   a body comprising a matrix including recrystallized silicon carbide and a secondary continuous phase dispersed within the matrix, wherein a portion of the recrystallized silicon carbide is exposed along a surface of the body, the secondary continuous phase includes a metal alloy having 70% to 85% aluminum, 10% to 15% silicon, and 5% to 15% magnesium, the body has an interconnected porosity that is substantially filled with the secondary continuous phase, and the body comprises a static impact resistance of at least 1800 MPa and a wear rate of at least about 0.03 mm$^3$/g as measured according to ASTM G76-07.

10. The composite article of claim 9, wherein the wear rate is not greater than about 0.13 mm$^3$/g.

11. The composite article of claim 9, wherein the secondary continuous phase comprises a material having a plastic strain at failure of at least 0.1% as measured according to a 3-point bend test according to ASTM 1161.

12. The composite article of claim 9, wherein the secondary continuous phase comprises a material having a $K_{IC}$ toughness of at least about 5 MPa m$^{1/2}$ as measured according to ASTM standard E399.

13. A method of forming a composite article comprising:
   providing a matrix comprising recrystallized silicon carbide; and
   infiltrating pores of the matrix with an infiltrant to form a body, wherein the infiltrant is an aluminum-based metal comprising 70% to 85 aluminum, 10% to 15% silicon, and 5% to 15% magnesium,
   wherein:
   the body has an interconnected porosity that is substantially filled with the infiltrant;
   a portion of the recrystallized silicon carbide is exposed along a surface of the body;
   a portion of the recrystallized silicon carbide is exposed along a surface of the body; and the body comprises a static impact resistance of at least 1800 MPa.

14. The method of claim 13, wherein the method of providing a matrix includes:
forming a mixture including silicon carbide particles of at least two different average grit sizes including intermediate silicon carbide particles and fine silicon carbide particles, the fine silicon carbide particles having an average particle size less than the average particle size of the intermediate silicon carbide particles;
forming the mixture to form a green article; and
firing the green article to form the matrix.

15. The method of claim 13, wherein infiltrating includes heating the matrix and the infiltrant to an infiltration temperature of at least about 700° C.

16. The composite article of claim 9, wherein the secondary phase comprises a metal alloy having 75to 80% aluminum, 11% to 14% silicon, and 7% to 11% magnesium.

* * * * *

UNITED STATES PATENT AND TRADEMARK OFFICE
CERTIFICATE OF CORRECTION

PATENT NO. : 8,865,607 B2
APPLICATION NO. : 13/301646
DATED : October 21, 2014
INVENTOR(S) : Christopher J. Reilly et al.

It is certified that error appears in the above-identified patent and that said Letters Patent is hereby corrected as shown below:

In the Claims,

Column 18, line 59, please delete "85 aluminum" and insert --85% aluminum--
Column 19, line 17, please delete "75to 80%" and insert --76% to 80%--

Signed and Sealed this
Eighth Day of September, 2015

Michelle K. Lee
*Director of the United States Patent and Trademark Office*